Oct. 12, 1943.   D. G. REMPEL   2,331,630
APPARATUS FOR MANUFACTURING HOLLOW RUBBER ARTICLES
Filed Jan. 28, 1941   2 Sheets-Sheet 1

INVENTOR.
DIETRICH G. REMPEL
BY J. Ralph Barron

Oct. 12, 1943.  D. G. REMPEL  2,331,630
APPARATUS FOR MANUFACTURING HOLLOW RUBBER ARTICLES
Filed Jan. 28, 1941   2 Sheets-Sheet 2

INVENTOR.
DIETRICH G. REMPEL
BY J Ralph Barrow

Patented Oct. 12, 1943

2,331,630

UNITED STATES PATENT OFFICE 2,331,630

APPARATUS FOR MANUFACTURING HOLLOW RUBBER ARTICLES

Dietrich G. Rempel, Akron, Ohio, assignor to Sun Rubber Company, a corporation of Ohio Application January 28, 1941, Serial No. 376,283

1 Claim. (Cl. 18—35)

This invention relates to hollow rubber articles, such as hollow rubber character dolls, and apparatus for manufacturing the same.

Heretofore, rubber articles of the character described have been produced by various "blowing" methods, wherein hollow preformed "biscuits" of unvulcanized rubber were placed in sectional molds of known type, and then internally expanded while subjected to vulcanizing heat. By various methods the articles were provided with apertures in the walls thereof for wind-operated noise making devices, either before complete vulcanization, for example, as shown in copending application, Serial No. 330,101, or by drilling or punching operations performed after the articles were removed from the sectional molds. Separate noise-making devices were then secured in the apertures thus formed in the articles, these devices being adapted to make squawking, whistling or vibratory noises upon depressing the article. Some of these noise makers in the past, however, have been unsatisfactory because they sometimes became loose and were frequently swallowed by children, with serious or unpleasant consequences.

An object of this invention is to provide for use in making an improved hollow rubber article in which a wind-operated noise maker or squawker is integrally formed in the wall of the article by vulcanization, a simple apparatus for manufacturing such articles at minimum cost of production.

Other objects of the invention will be manifest from the following brief description and the accompanying drawings.

Figure 1:
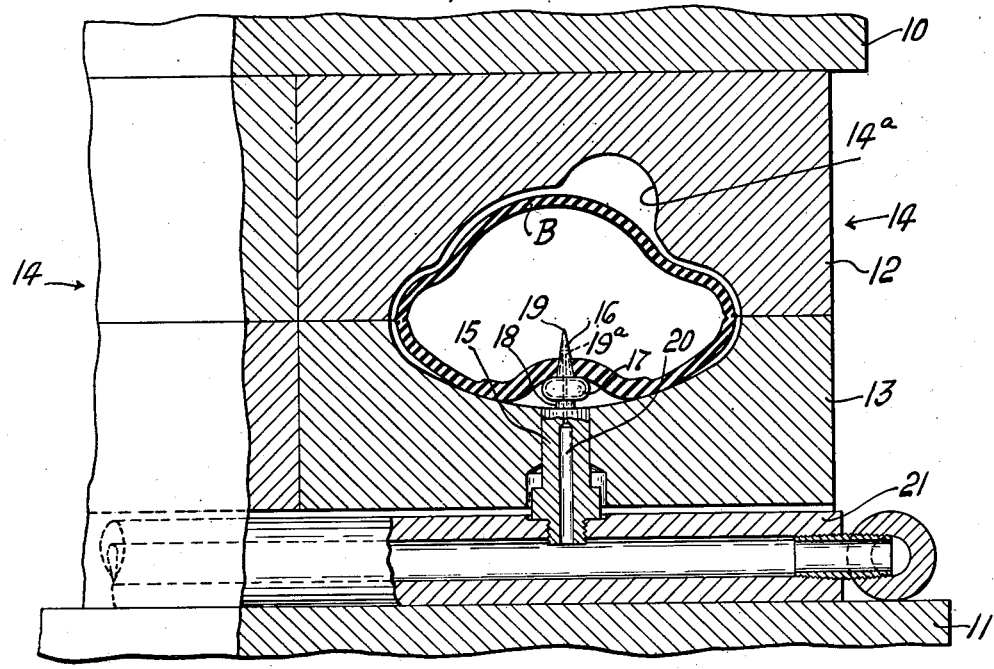
Figure 1 is a fragmentary view of a vulcanizing press, partially broken away, to illustrate a cross-section through a rubber doll mold, prior to a vulcanizing cycle.
Figure 2:
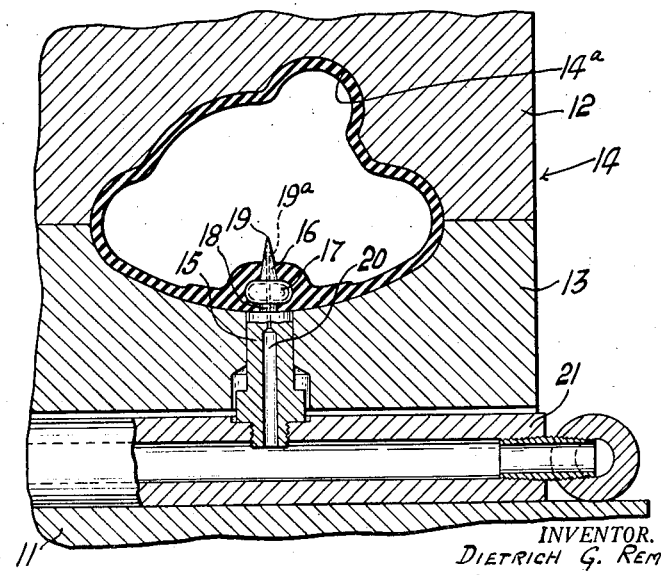
Figure 2 is a similar cross-section through the doll mold, but after vulcanization.

Referring particularly to Figures 1 and 2 of the drawings, the numerals 10 and 11 designate upper and lower platens of a vulcanizing press, of known type, operable for relatively moving the platens toward and from each other. Mounted on the respective platens may be upper and lower registering cavity-mold sections, 12 and 13, of a plurality of article forming molds 14. The molds 14 have cavities 14ᵃ therein for forming hollow rubber articles of desired shape, such as the character doll shown in Figure 3.

Suitably secured in the lower mold section 13 of each mold 14 may be a plug 15, the inner end of which is flush with the surface of the cavity 14ᵃ, and from which inner end projects a pin or core 16. The pin 16 may be formed with an enlarged ovate portion 17 in spaced relation to the surface of the lower mold cavity to provide a short constricted neck portion 18, an inwardly extending portion 19 of the pin being tapered to a sharp point for purposes to be described. A passage 20, extending through the plug 15 and core 16, communicates with the interior of the cavity 14ᵃ, through apertures 19ᵃ adjacent the end of the pointed portion 19 of the pin. The lower end of the plug 15 may be threaded into a supply conduit 21, connected to suitable source of supply (not shown), whereby pressure fluid, such as steam, compressed air, hot water, etc., may be supplied to the interior of the mold cavity 14ᵃ, through passage 20 during a vulcanizing cycle, and whereby suction may be applied in a similar manner, at the end of a vulcanizing cycle, as controlled by suitable valve means (not shown). Other cavity molds 14, of course, are supplied at the same time from the same sources of fluid-pressure and suction supply.

In the operation of the apparatus, while the vulcanizing press is in open condition a hollow "biscuit" or casing B, roughly preformed by pressing or stitching together the marginal edges of two sheets of unvulcanized rubber, in known manner, is placed in the cavity of the lower mold section so that the pointed portion 19 of the pin 16 will pierce through the lower wall portions of the "biscuit" B, whereby said lower wall will drape over the enlarged portion 17 of the pin (see Figure 1). The portion of the "biscuit" through which the pin projects may be thickened by means of an extra patch of rubber, to provide a requisite amount of rubber for forming the noise maker in the finished doll or article A. This additional thickness, however, should not be such will close the apertures 19ᵃ in the pin 16.

When "biscuits" B have been placed in the cavities of the lower mold sections of all molds 14, the press may be closed to move upper mold sections 12 into registry with the lower mold sections 13, as shown in Figure 1. Next, internal pressure may be applied within "biscuit" B, by supplying pressure fluid such as steam, compressed air, hot water, etc., from the source of supply (not shown), through conduit 21, passage 20 in plug 15 and pin 16, and through the outlets 19ᵃ, to conform the walls of the "biscuit" to the shape of the mold cavity, as shown in Figure 2, thereby to form a hollow rubber character doll, as shown in Figure 3, during a vulcanizing cycle in which the respective mold sections are reheated in known manner through the upper and lower platens.

The internal pressure within "biscuit" B, together with the heat of vulcanization, causes the rubber to flow about the enlarged portion 17 of pin 16 substantially as shown in Figure 2, thereby to form the thickened portion in the wall of the "biscuit," the pin enlargement thereby forming a chamber 23 in said thickened portion, and the reduced neck portion 18 and the tapered portion 19, of pin or core 16, forming apertures 24 and 25, respectively, which communicate the interior of the formed article A (Figure 3) with the exterior, through the chamber 23. When the vulcanizing cycle is completed the pressure fluid from the interior of "biscuit" B, or formed article, is cut off and suction is then applied, through conduit 21 and passage 20 in the plug 15, to withdraw the pressure fluid from the formed article, thereby permitting the vulcanizing press to be opened immediately at the end of the vulcanizing cycle for removal of the formed articles from the molds.

It is to be understood that the rubber articles may be "blown" during vulcanization by other known methods, to conform the rubber to the mold cavities 14ᵃ and about the pins 16 to form integral noise-making devices in the articles, as for example, by provision in the "biscuits" B of pills of volatile material, such as ammonia compounds, which create a gas when subjected to heat of vulcanization. This method, however, necessitates waiting for the molds to cool before the finished articles can be removed therefrom, unless the gas is vented through pins 16 as described above.

Figure 3:
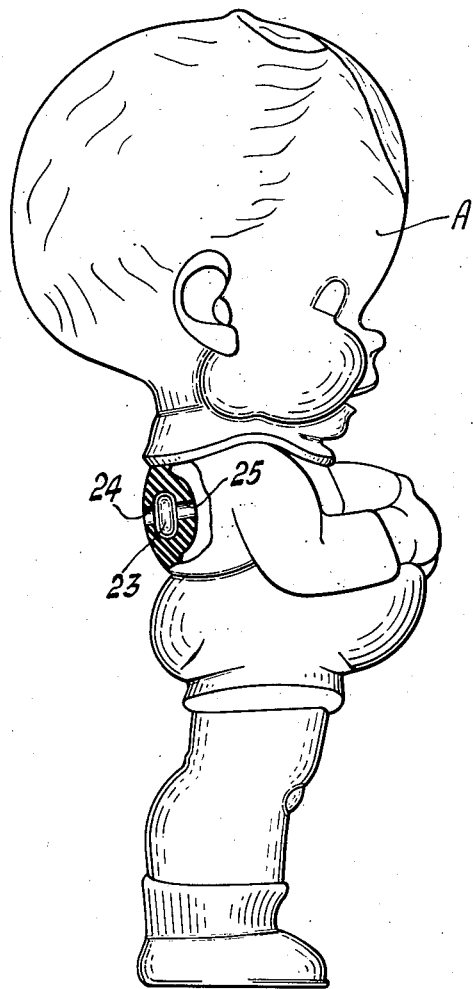
Figure 3 is a side elevation of a hollow rubber character doll, manufactured in accordance with the invention, partly broken away and in section through the integral noise making device.

With the above described apparatus hollow rubber toys, such as the character doll shown in Figure 3, may be vulcanized with noise-making devices integrally incorporated into the walls of the articles. Upon depressing any portion of the article shown in Figure 3, air will be forced through the aperture 25, chamber 23, and aperture 24, to cause a squawking or whistling sound, which sound is repeated when the article is released to allow it to expand to normal shape, due to an inrush of air.

Thus, has been provided an improved all-rubber toy, having a safe, wind-operated, noise-making device incorporated into the wall thereof by vulcanization. As the improved noise maker is an integral part of the wall of the doll, there is nothing to come loose, as for example, in the mouth of a child playing with the toy.

Modifications of the invention may be resorted to without departing from the spirit thereof or the scope of the appended claim.

What is claimed is:

Apparatus for manufacturing hollow rubber articles of the character described with integral noise making devices therein, comprising a sectional cavity mold, a piercing pin projecting inwardly of the surface of the mold cavity and pointed at its inner end, said pin having an enlarged portion in spaced relation to the surface of the mold cavity and outwardly of its pointed end, said pin having a passage therein which extends through the enlarged portion thereof and communicating with the mold cavity adjacent the pointed end of the pin inwardly of said enlarged portion, and means for supplying pressure fluid through said passage to apply internal pressure in a casing of unvulcanized rubber received in said mold cavity to form an article by vulcanization, whereby said internal pressure and the usual heat of vulcanization will cause rubber in the wall of the casing to flow about said pin enlargement to form in the wall of the article a chamber having oppositely disposed apertures communicating the interior of the article with the exterior thereof through said chamber.

DIETRICH G. REMPEL.